United States Patent [19]
Leuenberger et al.

[11] 3,929,443
[45] Dec. 30, 1975

[54] METHOD FOR CURING FISSURES AND THE LIKE OF WORKPIECES FORMED OF METAL OXIDE MATERIALS AND PROCESSED UNDER HIGH MATERIAL STRESS

[75] Inventors: Hans-Ulrich Leuenberger; Reiner Stemme, both of Thun, Switzerland

[73] Assignee: Lasag S.A., Thun, Switzerland

[22] Filed: June 17, 1974

[21] Appl. No.: 479,884

Related U.S. Application Data
[63] Continuation-in-part of Ser. No. 429,520, Jan. 2, 1974, abandoned.

[30] Foreign Application Priority Data
Jan. 11, 1973 Switzerland............................ 382/73

[52] U.S. Cl. ........................ 65/117; 65/114; 23/305
[51] Int. Cl.² ......................................... C03B 29/00
[58] Field of Search .......... 29/526.2, 526.4; 65/114, 65/115, 117; 23/305

[56] References Cited
UNITED STATES PATENTS
1,814,219  7/1931  Jaeger et al........................ 65/114 X
3,352,655  11/1967  Barch et al. ........................ 65/114 X Primary Examiner—Arthur D. Kellogg
Attorney, Agent, or Firm—Werner W. Kleeman

[57] ABSTRACT

A method for curing fissures and cracks or the like at workpieces formed of metal oxide materials and processed under high material stress, wherein the workpieces are heated in a furnace to a temperature in the range of 1000° to 1600°C.

6 Claims, No Drawings

METHOD FOR CURING FISSURES AND THE LIKE OF WORKPIECES FORMED OF METAL OXIDE MATERIALS AND PROCESSED UNDER HIGH MATERIAL STRESS

CROSS-REFERENCE TO RELATED CASE

This is a continuation-in-part application of our commonly assigned, copending U.S. application Ser. No. 429,520, filed Jan. 2, 1974, now abandoned.

BACKGROUND OF THE INVENTION

The present invention relates to a new and improved method of curing or closing fissures or the like at workpieces formed of metal oxide materials.

Workpieces formed of metal oxide materials, such as rubies, sapphires and so forth, as well as also sintered ceramics, for example $Al_2O_3$, $SiO_2$, $MgOSiO_2$, BeO and so forth, and which have been fabricated under high material stress, such as electronically— or laser beam— machined, possess internal mechanical stresses which during the further working or treatment of such workpieces can lead to rupture of such workpieces. This danger of rupture generally is dependent upon the nature of the post-treatment as well as the size of the workpiece.

It has been found that, for instance, during the fabrication of bearing jewels for watches formed of synthetic precious stone disks with increasing diameter of the bore, yet also increasing thickness of the disks, there are reached reject quotas which impair the economies even with modern processing techniques, such as for instance the fabrication of the bores through the use of laser energy.

This danger of rupture also can not be eliminated by means of known techniques wherein the material prior to its processing is subjected to a thermal treatment, since the fissures and cracks, which during further treatment can lead to rupture of the workpieces, are only then brought about due to the high material stress of the preceding treatment.

SUMMARY OF THE INVENTION

Hence, it is a primary object of the present invention to divise an improved method of curing fissures and the like in workpieces formed of metal oxide materials in an efficient and reliable manner.

Another and more specific object of the present invention relates to a new and improved method of curing fissures and the like in workpieces formed of metal oxide materials in a manner in which it is possible to quite considerably reduce the rupture danger of the workpieces.

Now in order to implement these and still further objects of the invention, which will become more readily apparent as the description proceeds, the invention contemplates that for the purpose of curing such fissures or the like the workpieces are heated in a furnace to a temperature in a range of 1000° to 1600°C.

DETAILED DESCRIPTION OF THE INVENTION

The invention will be described hereinafter more fully in conjunction with an exemplary embodiment of the method aspects of this development. Such exemplary embodiment concerns the thermal post-treatment of workpieces formed of synthetic ruby which have been fabricated under high material stress.

If it is assumed, again purely by way of example, that the workpiece in question is intended to be used as a bearing jewel or stone for watches then the same may be provided, for instance, with a bore therethrough which is formed by means of a conventional laser beam-machining process. Such workpiece then can be further treated or worked so as to be employed as the bearing jewel or stone of watches. The thickness of the workpieces, when used for this exemplary purpose, can vary within normal limits, for instance between 24 and 41/100th millimeters.

Of course the invention is in no way limited to workpieces intended to serve as bearing jewels or stones of watches and many other workpieces can be treated according to the method aspects of this development and serving completely different purposes, as will be explained more fully hereinafter. Regardless of the intended use of the workpieces the cleaned workpieces are filled into sintered aluminum oxide crucibles and heated in a high-temperature furnace with uniform temperature increase within 10 hours to 1500°C. The workpieces remain for 36 hours at this temperature in order to be thereafter cooled in steps or stages of 50°C per hour down to 800°C. Then the furnace is shutdown and the workpieces are permitted to cool further to about 200°C by releasing their heat through radiation, this process being carried out during approximately 15 hours. Further cooling down to room temperature then occurs within about 24 hours with the door of the furnace slightly open.

The process in question is basically equally successfully applicable for most workpieces, such as for instance small precision components, drawing dies for wires, perforated blocks for the guiding of threads and the like at spinning and weaving machines, conical bearing jewels for conical bearings and hemispherical shaped bearing jewels for ball bearings, spinning nozzles for man-made fibers, filter nozzles for beverages, chemicals and so forth, injection nozzles, for instance for combustion engines and nozzle assemblies, substrates for integrated circuits and so forth, formed of metal oxide workpieces, and wherein it should be mentioned that apart from rubies and sapphires there can be particularly employed sintered ceramics, such as $Al_2O_3$, $SiO_2$, steatite, beryllia and so forth. Both the heating-up time as well as also the temperature and the residence time are dependent to a certain extent upon the size of the workpieces and the nature of the relevant workpiece and thus must be varied within certain limits, namely the heating-up time between 4 and 16 hours, the heating temperature between 1000° and 1600°C, the residence time between 12 and 48 hours. Instead of using the cooling steps, it is also possible for a continuous cooling to occur in the furnace.

It has been surprisingly found that when employing such thermal treatment the rupture danger, even if not completely eliminated in the case of thicker workpieces, still is reduced to a few fractions of a percent.

A further effect of the thermal treatment according to the method aspects of this development is the smoothing of the surface of the workpieces which is visually perceptible in terms of a clearly noticeable polish of the surfaces which were previously rough and dull. In particular, especially for instance in the case of laser energy-bored watch bearing jewels, it is possible to also smooth irregularities of the borehole or bore, so that the steel wire which is to be introduced through the bore for the further treatment or processing, can oftentimes be chosen of larger diameter than in the case of watch jewels which were not thermally treated, and at least such steel wires can be more easily threaded through the bores.

It appears also possible to dispense with any further post-treatment of the bores which have been produced by laser energy owing to such smoothing effects.

Furthermore, it has been observed that very fine, small cracks in the workpiece can be cured by the afore-discussed thermal treatment, or at least are no longer visible after the thermal treatment.

All of these effects of the described thermal treatment are surprising to those skilled in the art since on the basis of prior experience which has been obtained in this field of technology, it was thought that stress relief possibly leading to closing of fissures, for instance of rubies, first was possible at temperatures exceeding 1800°C. A thermal treatment of workpieces in this temperature region is, however, for various reasons uneconomical or difficult to carry out technically. On the one hand, following such treatment a large proportion of the workpieces adhere so strongly to one another that they cannot be separated from one another with the use of acceptable procedures or are in fact even destroyed. Moreover, the relevant temperature region places high requirements upon the heating furnace, especially upon its heating elements. Also the costs are correspondingly high. Finally, the surfaces of the workpieces react with the furnace atmosphere, especially also with exhaust gases emanating from the walls of the crucible and the heating elements.

All of these drawbacks now can be overcome in a most surprising manner by carrying out a thermal treatment at a temperature which is lower than that which is necessary at the present time for stress relieving of workpieces with the aforementioned effect based upon the technology presently known in the art.

While there is shown and described present preferred embodiments of the invention, it is to be distinctly understood that the invention is not limited thereto, but may be otherwise variously embodied and practiced within the scope of the following claims. Accordingly,

What is claimed is:

1. In a method of treating machined workpieces of rubies, sapphires and sintered metal oxides wherein fissures are present in the workpieces as a result of the machining operation, the improvement comprising the steps of:

providing a workpiece having fissures present therein as a result of the machining operation; and curing the fissures by heating the workpiece in a furnace to a temperature ranging from about 1200° to 1600°C for a time which is effective in reducing the magnitude of the fissures whereby the danger of rupture of the workpiece by said fissures is lessened.

2. The method as defined in claim 1, including the step of maintaining the workpiece in said temperature range during a period of 12 to 48 hours.

3. The method as defined in claim 2, including the step of thereafter subjecting the workpiece in the furnace to natural cooling.

4. The method as defined in claim 2, including the step of cooling the workpiece in steps of 50°C per hour down to 800°C and thereafter subjecting the workpiece to normal cooling in the furnace.

5. The method as defined in claim 1, wherein the workpiece is a watch bearing jewel.

6. The method as defined in claim 5, wherein said watch bearing jewel is formed of ruby and bored by means of laser energy.

* * * * *